Sept. 9, 1969    C. W. BRANCH    3,466,082
PICKUP TRUCK BED MOUNTED CAMPER TENT
Filed Jan. 19, 1967    3 Sheets-Sheet 1

Chester W. Branch
INVENTOR.

Sept. 9, 1969 C. W. BRANCH 3,466,082
PICKUP TRUCK BED MOUNTED CAMPER TENT
Filed Jan. 19, 1967 3 Sheets-Sheet 2
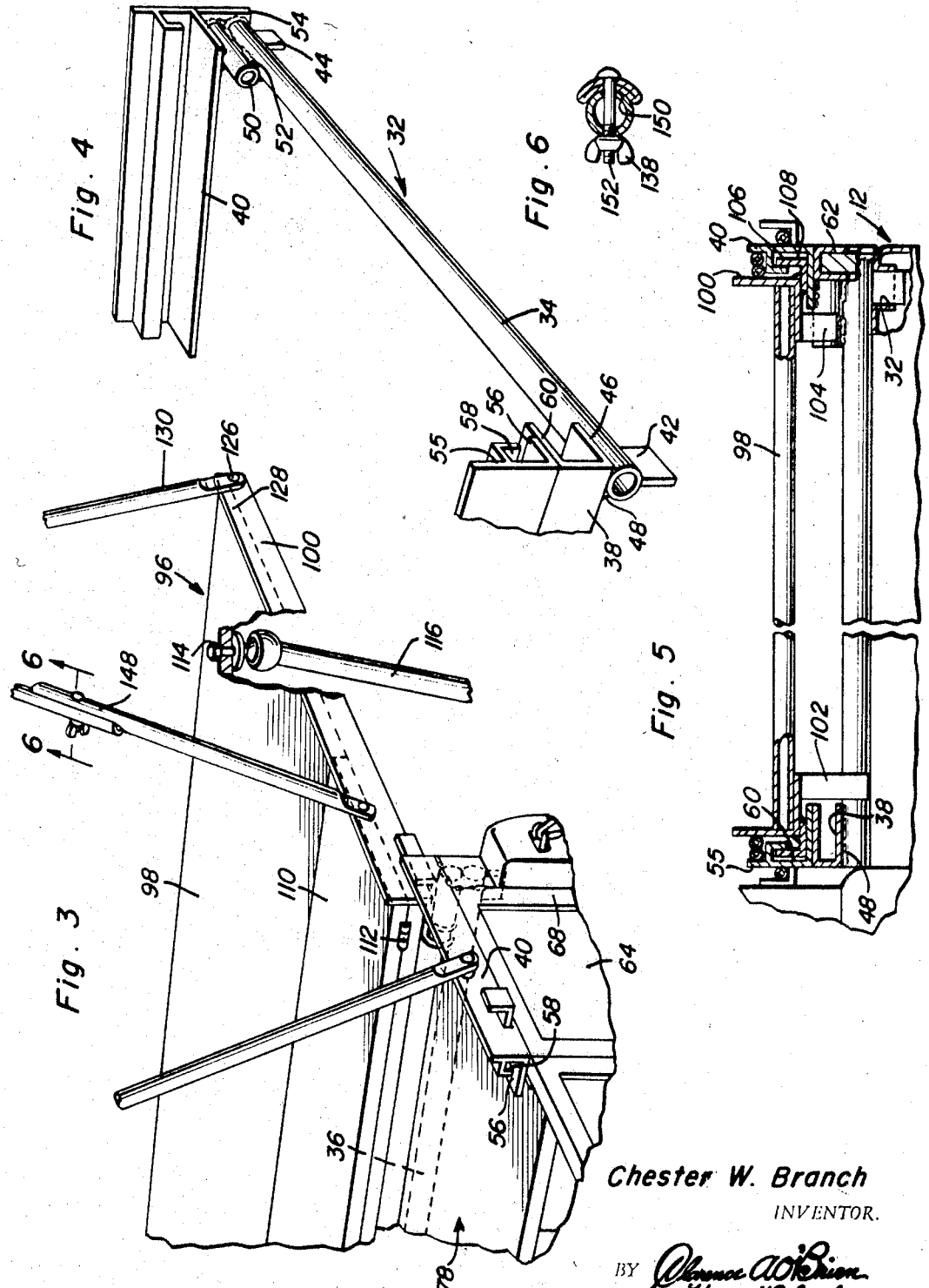
Chester W. Branch
INVENTOR.

Sept. 9, 1969   C. W. BRANCH   3,466,082
PICKUP TRUCK BED MOUNTED CAMPER TENT
Filed Jan. 19, 1967   3 Sheets-Sheet 3
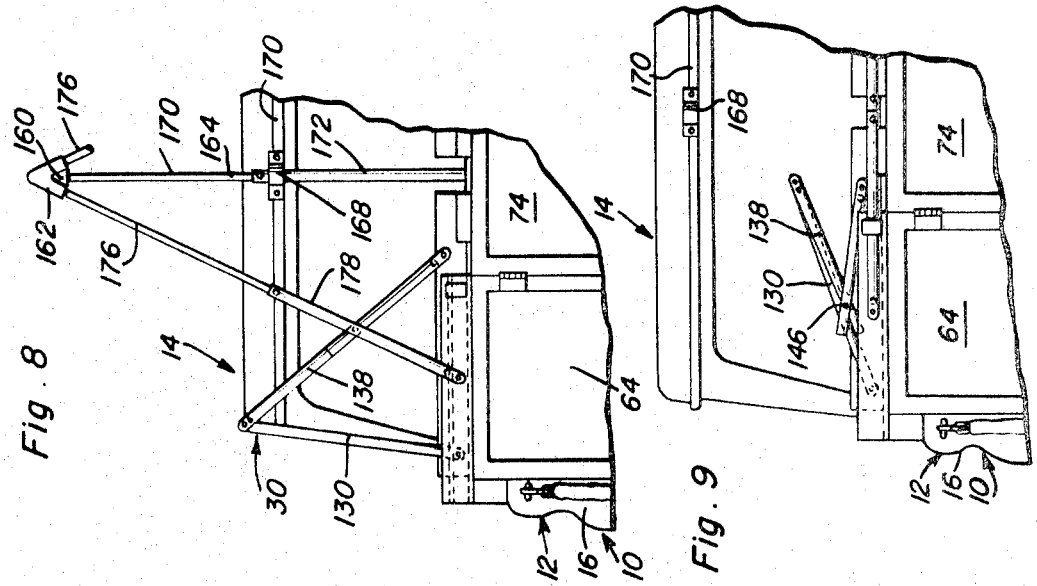
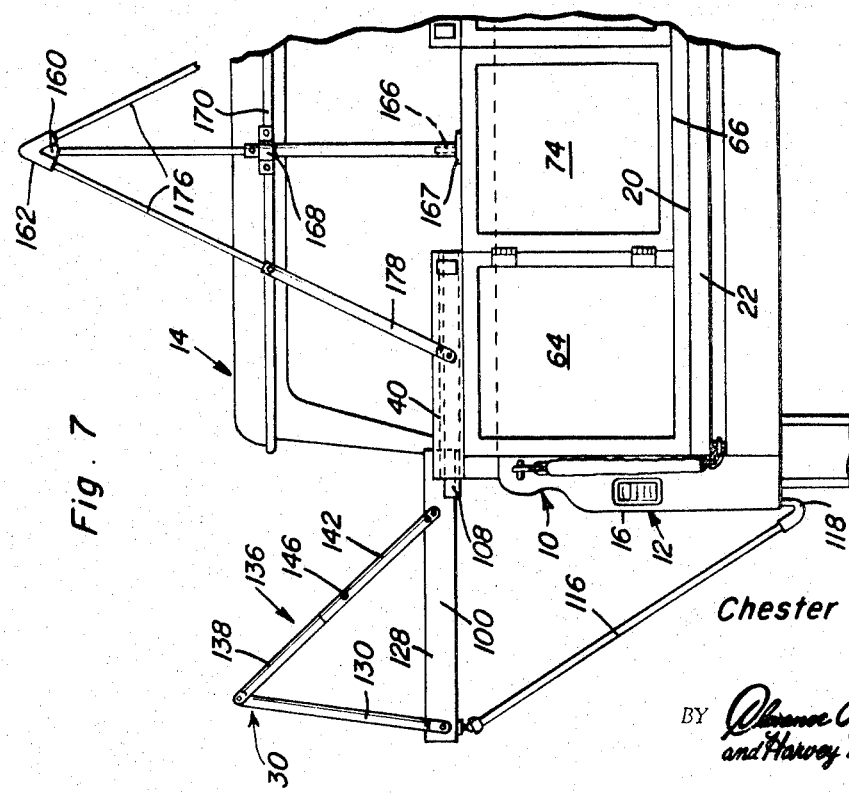
Chester W. Branch
INVENTOR.

United States Patent Office 3,466,082
Patented Sept. 9, 1969

---

3,466,082
PICKUP TRUCK BED MOUNTED CAMPER TENT
Chester W. Branch, 5507 W. Malcomb,
Pine Bluff, Ark. 71601
Filed Jan. 19, 1967, Ser. No. 610,269
Int. Cl. B60p 3/34
U.S. Cl. 296—23                    10 Claims

ABSTRACT OF THE DISCLOSURE

A collapsible tent-like camper unit specifically adapted for mounting on a pickup truck load bed and including opposite side generally horizontally disposed portions shiftable between closely adjacent positions inwardly of the side walls of the associated pickup truck load bed and extended positions projecting outwardly beyond the opposite side walls of the load bed and defining upwardly facing support surfaces upon which bed mattresses may be disposed.

---

This invention relates to a camper tent construction adapted for use in conjunction with a pickup truck load body and which includes a pair of generally parallel elongated housings generally rectangular in cross-section and adapted to extend longitudinally of the associated pickup truck bed immediately inwardly of the opposite side walls of the load bed. The camper tent construction includes a pair of generally horizontally disposed panel-like members supported from opposite side portions of the assembly for movement toward and away from each other between retracted positions with the adjacent edges of the panel-like members disposed closely adjacent each other and the remote edge portions of the panel-like members disposed inwardly of the side walls of the associated truck bed and extended positions with the panel-like members shifted horizontally apart and at least their remote marginal edge portions projecting outwardly beyond the corresponding side walls of the associated load bed.

Each of the panel-like members has pivotally supported therefrom a generally inverted U-shaped support for swinging movement of the supports about axes extending longitudinally of the associated load bed between upstanding positions and collapsed positions with their free edge portions swung inwardly and downwardly in closely overlying relation to the generally horizontal panel-like members. In addition, the camper tent construction or assembly of the instant invention also includes an upper center ridge pole disposed generally mid-way between the opposite side support members and at an elevation above the support members and the center portion of a tent-like cover is supported from the ridge pole while opposite side portions are supported from the inverted U-shaped support members when the latter are in their upright positions, opposite generally vertical side wall portions of the tent-like cover extending downwardly over the remote surfaces of the upstanding opposite side support members.

The main object of this invention is to provide a camper tent construction for use in conjunction with a pickup truck load bed and constructed in a manner whereby the tent-like cover and the collapsible cover supporting members may be readily collapsed into a compact state for storage with no portions of the tent construction or assembly projecting horizontally outwardly beyond any portion of the associated pickup truck load bed or projecting any more than slightly above the upper portions of the load bed.

Another object of this invention is to provide a pickup truck load bed mounted camper tent construction in accordance with the immediately preceding object and including means for providing two double bunks and ample cabinet storage space in addition to center flooring space defined by the central portion of the associated pickup truck load bed.

A still further object of this invention is to provide a pickup truck camper tent construction constructed in a manner whereby the tent-like cover and supporting structure therefor may be readily removably supported from an associated pickup truck load bed and the cabinet defining housings forming a part of the camper tent construction may be also removably supported from the associated pickup truck load bed independently of the tent-like cover and cover supporting assembly.

A final object of this invention to be specifically enumerated herein is to provide a camper tent construction in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged fragmentary perspective view of the rear right hand portion of the camper tent construction;

FIGURE 4 is a perspective view of the left hand portion of the mounting means of the camper tent construction by which the latter is supported from a pickup truck load bed;

FIGURE 5 is a fragmentary longitudinal vertical sectional view taken substantially upon a plane passing through the left side portion of the camper tent construction;

FIGURE 6 is an enlarged fragmentary sectional view taken substantially upon the plane indicated by the section line 6—6 of FIGURE 3;

FIGURE 7 is a fragmentary enlarged rear elevational view of the assemblage illustrated in FIGURE 1 but with the tent-like cover removed;

FIGURE 8 is a rear fragmentary elevational view similar to FIGURE 7 but illustrating the left hand horizontally extendible portion of the construction in a retracted position; and FIGURE 9 is a rear elevational view similar to FIGURE 8 but illustrating the tent-like cover supporting portions of the camper tent construction in collapsed positions.

Figure 1:
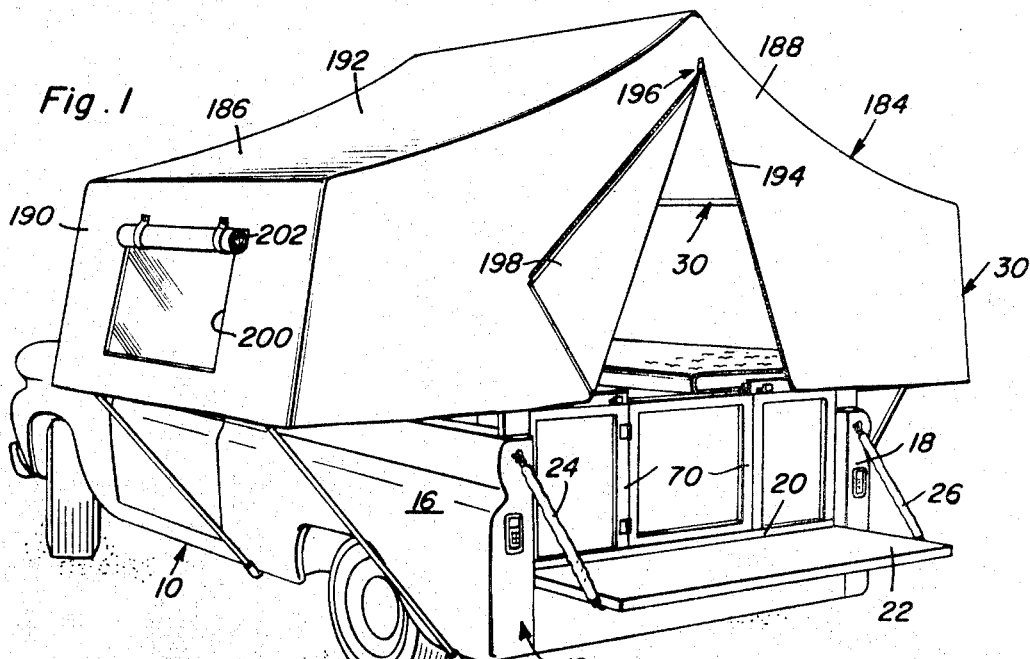
FIGURE 1 is a perspective view of a pickup truck with the camper tent construction of the instant invention operatively associated therewith.

Referring now more specifically to the drawings the numeral 10 generally designates a conventional form of pickup truck including a load bed assembly generally referred to by the reference numeral 12 and a cab portion generally referred to by the reference numeral 14. The load bed assembly 12 includes opposite side walls 16 and 18 which project above the flooring 20 and a tailgate 22 hingedly secured along its lower marginal edge portion to the rear edge portion of the flooring 20.

The tailgate 22 is swingable to the horizontally disposed position thereof illustrated in FIGURE 1 of the drawings from an upstanding position extending between the side walls 16 and 18 and a pair of elongated flexible members 24 and 26 secured between the side walls 16 and 18 and the corresponding ends of the tailgate 22 releasably support the latter when it is horizontally disposed so as to form a continuation of the flooring 20.

The preceding is of course a description of a conventional type of pickup truck with which the camper tent construction of the instant invention and generally referred to by the reference numeral 30 is adapted to be used, the pickup truck side walls 16 and 18 each including front and rear upwardly opening sockets 31 adapted to be utilized in securing extension side walls to the conventional side walls 16 and 18 but utilized in conjunction with the camper tent construction 30 to secure the latter to the load bed assembly 12.

The camper tent construction 30 includes a base frame referred to in general by the reference numeral 32 and including a pair of opposite side longitudinal members 34 and 36 interconnected by means of a forward transverse channel member 38 at their forward ends and including inwardly directed and transversely extending members 40 at their rear ends.

The longitudinal members 34 and 36 each include front and rear depending lugs 42 and 44 which are removably downwardly telescoped into the corresponding upwardly opening sockets 31 formed in the side walls 16 and 18 of the load bed assembly 12 thus securing the frame 32 to the load bed assembly 12. The channel member 38 opens rearwardly and has its lower flange 46 secured, at its opposite end portions, to the forward end portions of the longitudinal members 34 and 36 as at 48 by welding. The rear ends of the longitudinal members 34 and 36 have spacing sleeves 50 secured thereto by welding 52 and end plates 54 are secured by welding over the rear ends of the longitudinal members 34 and 36 and the spacing sleeves 50.

The channel member 38 includes a pair of opposite end transverse members 55 which are substantially identical to the members 40 and which define transversely extending guides including upwardly facing bearing surfaces 56 and opposing inner and outer guide surfaces 58 and 60. The undersurfaces of the members 55 are secured to the upper flange 60 at the opposite ends of the member 38 and the similar members 40 are secured to the upper edge portions of the end plates 54 and the upper marginal frame portions 62 of a pair of partial rear walls 64 whose lower edges abut and rest upon the rear edge portion of the flooring 20. The lower marginal edge portions of the partial rear walls 64 are defined by a single transversely extending brace member 66 extending between the remote upstanding outer marginal frame portions 68 of the partial rear walls 64.

Figure 2:
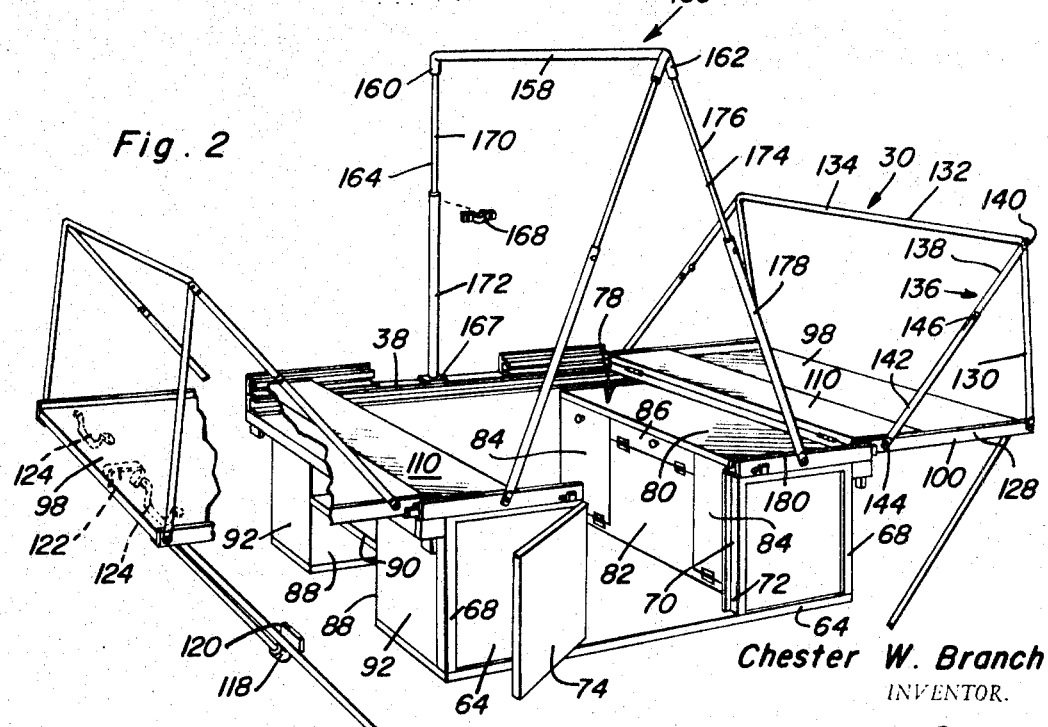
FIGURE 2 is a perspective view of the camper tent construction of the instant invention removed from the associated truck and with portions of the camper tent construction being broken away and the tent-like cover of the construction removed.

The rear wall portions 64 include adjacent inner marginal frame portions 70 which are spaced apart and define an opening 72 therebetween, a hinged rear door 74 being hingedly supported from the inner marginal frame portion 70 of the left hand partial rear wall 64 for swinging movement between the open position illustrated in FIGURE 2 of the drawings and the closed position illustrated in FIGURES 1, 3 and 7–9 of the drawings. Of course, the rear door 74 may be provided with any suitable latching mechanism selectively engageable with the right hand inner marginal frame portion 70 to releasably lock the rear door 74 in its closed position.

The preceding description of the frame 32 sets forth an integral unit which may be readily removed from engagement with the load bed assembly 12 as desired.

The camper tent construction 30 includes a pair of opposite side substantially identical horizontally elongated housings referred to in general by the reference numeral 78 which are receivable in the load bed assembly 12 independently of the frame 32. The housings 78 each include a top wall 80 disposed at an elevation below the members 40 and 55, a front wall 82 and suitable opposite end walls (not shown). The front walls 82 are each provided with swingable closures 84 and 86 for corresponding openings formed in the front or inner wall 82 and each housing 78 additionally includes a pair of opposing transverse walls 88 between which an upper horizontal shelf 90 is secured, the closures 86 closing the inner portions of the areas disposed above the shelves 90 and the closures 84 closing the innermost portions of the areas disposed between the transverse walls 88 and the corresponding end walls of the housings 78, the latter areas being closed at their outer ends by means of outer walls 92.

If it is desired the housing 78 may be formed as integral portions of the frame 32. However, in order to simplify and facilitate ready mounting of the camper tent construction on the load bed assembly 12, the housings 78 are formed as separate components and may be secured in position within the load bed assembly 12 in any convenient manner. However, if the housings 78 are to be constructed as integral portions of the frame 32, the partial rear walls 64 may be formed as the end walls of the corresponding housings 78. Further, the areas disposed below the shelves 90 are provided to receive the standard inwardly projecting wheel wells of the load bed assembly 12.

A pair of horizontally shiftable mounting structures generally referred to by the reference numerals 96 are supported from opposite side portions of the frame 32. Each of the mounting structures 96 includes a horizontally disposed panel member 98 having L-shaped mounting flanges 100 secured to their opposite ends in any convenient manner. The inner end portions of each pair of front and rear mounting flanges 100 have depending stop arms 102 and 104 secured thereto (see FIGURE 5) for engagement with the forward end of the corresponding longitudinal member 34 and the corresponding spacing sleeve 50, the mounting flanges 100 having short L-shaped flanges 106 secured to their inner ends and slidingly engaged with the bearing surface 56. The upstanding flange portions 108 of the flanges 106 are received between the guide surfaces 58 and 60 and therefore each of the panel members 98 is mounted for horizontal sliding movement between the extended positions thereof illustrated in FIGURES 2 and 3 and the retracted positions thereof illustrated in FIGURES 8 and 9. The inner marginal edge portions of the panel members 98 have extension panels 110 pivotally secured thereto as at 112 for swinging movement between a retracted position such as that illustrated in FIGURES 2 and 3 and an extended position overlying the adjacent top wall 80 of the corresponding housing 78. Each of the panel members and extension panels 110 is adapted to have disposed thereon one double mattress or two single mattresses whereby two persons may sleep on each mounting structure 96.

A plurality of inclined support arms have their upper end swivelly connected to the outer front and rear corners of each panel member 98 as at 114 and each support arm 116 has a lower end portion adapted to be removably telescoped into an upwardly and outwardly inclined socket 118 carried by a suitable mounting bracket 120 secured to a lower portion of the load bed assembly 12. The support arm assemblies 116, when not in use, are swung to horizontal positions extending longitudinally along the corresponding panel member 98 and have their free ends removably engaged with retaining clips 122 carried by the outer marginal edge portions of the panel members 98 centrally intermediate their opposite ends.

In addition, each of the panel members 98 includes a pair of depending handles 124 for facilitating the sliding of the panel members 98 between their extended and retracted positions.

Pivotally secured to the outer marginal edge portion of each panel member 98 by means of fasteners 126 secured through the outer end portions of the upstanding flange portions 128 of the mounting flanges 100 are the lower ends of the legs 130 of a pair of inverted generally U-shaped opposite side wall frames 132. The upper ends of the legs 130 of each frame 132 are interconnected by means of an integral bight portion 134 and each frame 132 is braced in its erect position by means of a diagonal brace assembly 136 secured to the upper end of each leg 130 and the inner end of the corresponding upstanding flange 128. Each of the brace assemblies 136 includes an upper section 138 pivotally secured to the upper end of the corresponding leg 130 as at 140 and a lower section 142 pivotally secured at its lower end to the corresponding upstanding flange portion 128 as at 144, the upper and lower ends of each pair of sections 142 and 138 being pivotally connected together as at 146. The upper end of each section 142 is flattened as at 146. The upper end of each section 142 is flattened as at 148 to form a semi-cylindrical recess 150 in which the adjacent end of the corresponding upper section 138 is embracingly received and secured by means of a threaded pivot fastener 152, see FIGURE 6, which may be loosened so as to enable the sections 138 and 142 to pivot relative to each other between the erected positions thereof illustrated in FIGURES 2 and 3 and the collapsed positions thereof illustrated in FIGURE 9.

A ridge pole assembly generally referred to by the reference numeral 156 is provided and includes a horizontal ridge pole member 158 including a downwardly opening fitting 160 on one end and a fitting 162 on its other end defining a pair of downwardly opening and divergent recesses. A substantially vertically disposed leg 164 has its upper end telescoped into the downwardly opening fitting 160 and is its lower end telescoped downwardly over an upwardly projecting pin 166 mounted on a mounting block 167 carried by the central portion of the channel member 38. The leg 164 is also braced intermediate its upper and lower ends by means of a removable clamp 168 embracingly engaging the leg 164 and removably secured to the rear rain gutter 170 of the cab portion 14. Further, the leg 164 includes upper and lower telescopically engaged sections 170 and 172 which may be separated for compact storage of the leg 164.

The end of the ridge pole member 158 to which the fitting 162 is secured is supported by means of a pair of downwardly divergent legs 174 including removably telescopingly engaged upper and lower sections 176 and 178, the lower ends of the section 178 being pivotally secured to the members 40 intermediate their opposite ends as at 180 and the upper ends of the sections 176 being telescoped into the downwardly opening and divergent recesses formed in the fitting 162.

A flexible tent-like cover assembly generally referred to by the reference numeral 184 is provided and includes a center panel 186 and a pair of front and rear wall panels 188. The center panel 186 includes opposite end side wall forming sections 190 and opposite side top wall forming center sections 192. The center section 190 may have its opposite end portions removably secured to the remote edge portions of the panel members 98 in any convenient manner (not shown) and the center panel 186 is passed over the bight portions 134 and the ridge pole member 158.

The rear end wall panel 188 has a diagonal slit 194 formed therein which is disposed adjacent and generally parallels one of the legs 174 and the portion of the rear end wall panel 188 defining one side of the slit 194 may be removably secured to that leg 174. The slit is provided with a slide fastener assembly generally referred to by the reference numeral 196 and may therefore be selectively opened and closed, the triangular portion 198 of the rear wall panel 188 disposed on the other side of the slit 194 being free for swinging to the open position illustrated in FIGURE 1 of the drawings whereby a doorway is formed between the partial rear walls 64 and the downwardly divergent legs 174 when the rear door 74 is open.

The partial rear walls 164 and the rear door 74 are disposed forwardly of the front face of the tailgate 22 when the latter is in its raised closed position and each of the sections 190 may be provided with a suitable transparent window panel 200 which may be closed by means of a corresponding drop flap 202.

When the camper tent construction 30 is fully collapsed, a suitable cover (not shown) of flexible material such as canvas may be secured over the load bed assembly 12 in any convenient manner. Such a cover may be in the form of a tonneau cover or the like.

When it is desired to erect the camper tent construction 30, the frames 132 are first erected to the positions thereof illustrated in FIGURE 2 of the drawings. Thereafter, the person erecting the camper tent construction 30 may enter the load bed assembly 12 of the pickup truck 10 and erect the ridge pole member 58 beneath the center portion of the tent-like cover construction 184. At this point the sections 192 will be loosely draped between the bight portions 34 and the ridge pole member 158 thus providing ample slack in the tent-like cover 184 so as to enable the ridge pole member 158 to be erected. Thereafter, the person erecting the cover 184 may dismount from the load bed assembly 12 and outwardly shift the mounting structures 98 to the positions thereof illustrated in FIGURE 2 of the drawings and place the free ends of the support arms 116 in the sockets 118. Thereafter, the extension panels 110 may be pivoted 180° from the positions thereof illustrated in FIGURES 2 and 3 of the drawings. Of course, the portions of the load bed assembly 12 defined between the housings 78 may be utilized to store the mattresses which are to be placed upon the panel members 98 and any other camping equipment or the like which does not have a storage place within the housings 78.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a collapsible camper tent construction including base means having opposite side portions and adapted to form at least some of the boundaries of said tent construction when the latter is erected, mounting means supported from each of said opposite side portions for horizontal extension and retraction relative to said side portion, a pair of upstanding opposite side walls frame means supported from said mounting means and adapted to have a flexible cover stretched thereover with opposite marginal portions of said cover passing over the upper ends of and downwardly over the remote sides of said side wall frame means for operative connection with said mounting means, said mounting means comprising generally horizontally disposed panel-like members adapted to define supports upon which bed mattresses may be placed and including adjacent marginal portions disposed in closely adjacent relation when said mounting means are retracted toward each other and supported for swinging about horizontal axes paralleling said slide portions into overlying relation with the remote marginal portions of panel-like members.

2. The combination of claim 1 wherein said side wall frame means includes upper marginal edge portions adapted to have said cover passed thereover, a horizontal central ridge pole elevated above and generally paralleling said upper marginal portions and adapted to have said cover passed thereover, said base means including end portions below the opposite ends of said ridge pole generally horizontally aligned with said mounting means one end of said ridge pole being supported from an upright standard supported at its lower end from the corresponding end portion of said base means, the other end of said ridge pole being supported from the apex portion of an inverted V-shaped standard including downwardly divergent legs whose lower ends are supported from the lower portion of said base means below said other end of said ridge pole.

3. The combination of claim 1 wherein said upstanding frame means each comprise an inverted generally U-shaped member including a pair of depending legs whose lower ends are pivotally supported from the corresponding mounting means.

4. In combination, a collapsible camper tent construction including base means having opposite side portions and adapted to form at least some of the boundaries of said tent construction when the latter is erected, mounting means supported from each of said opposite side portions for horizontal extension and retraction relative to said side portions, a pair of upstanding opposite side walls frame means supported from said mounting means and adapted to have a flexible cover stretched thereover with opposite marginal portions of said cover passing over the upper ends of and downwardly over the remote sides of said side wall frame means for operative connection with said mounting means, said mounting means comprising generally horizontally disposed panel-like members adapted to define supports upon which bed mattresses may be placed and including adjacent marginal portions disposed in closely adjacent relation when said mounting means are retracted toward each other and supported for swinging about horizontal axes paralleling said side portion into overlying relation with the remote marginal portions of panel-like members, said base means comprising a vehicle including a load bed provided with upstanding opposite side walls defining at least in part, said opposite side portions, said construction including a pair of elongated spaced apart opposite side housings positioned on said load bed immediately inwardly of said opposite side walls, said housings being internally compartmented, said load bed including an upstanding tailgate extending between the rear ends of said opposite side walls and hingedly secured, along its lower marginal portion, to the rear edge portion of said load bed, said opposite side housings including rear end walls disposed inwardly of said tailgate, a horizontal central ridge pole elevated above and generally paralleling said upper marginal portions when said side wall frame means are upright and adapted to have said cover passed thereover, said base means including end portions below the opposite ends of said ridge pole generally horizontally aligned with said mounting means, one end of said ridge pole being supported from an upright standard supported at its lower end from the corresponding end portion of said base means, the other end of said ridge pole being supported from the apex portion of an inverted V-shaped standard including downwardly divergent legs whose lower ends are supported from the lower portion of said base means below said other end of said ridge pole, a flexible cover having opposite marginal portions stretched over the upper portions of said frame means, downwardly over the remote sides of said side wall frame means and operatively connected to said mounting means along said lower marginal portions, said cover including a rear panel disposed rearwardly of an adjacent said inverted V-shaped standard, said rear panel including portions extending along and being adapted to be secured to the leg portions of said inverted V-shaped standard, one of said portions of said rear panel including a generally inverted V-shaped flap portion swingable into and out of position closing the area between the downwardly divergent legs of said inverted V-shaped standard, and the free edge portion of said flap and the other portion of said rear panel including coacting slide fastener means removably securing said free edge portion of said flap portion to said other portion of said rear panel.

5. In combination, a collapsible camper tent construction including base means having opposite side portions and adapted to form at least some of the boundaries of said tent construction when the latter is erected, mounting means supported from each of said opposite side portions for horizontal extension and retraction relative to said side portion, a pair of upstanding opposite side walls frame means supported from said mounting means and adapted to have a flexible cover stretched thereover with opposite marginal portions of said cover passing over the upper ends of and downwardly over the remote sides of said side wall frame means for operative connection with said mounting means, said mounting means comprising generally horizontally disposed panel-like members adapted to define supports upon which bed mattresses may be placed and including adjacent marginal portions disposed in closely adjacent relation when said mounting means are retracted toward each other and supported for swinging about horizontally axes paralleling said side portions into overlying relation with the remote marginal portions of panel-like members, said base means comprising a vericle including a load bed provided with upstanding opposite side walls defining at least in part, said opposite side portions, said construction including a pair of elongated spaced apart opposite side housings positioned on said load bed immediately inwardly of said opposite side walls, said housing being internally compartmented, said mounting means comprising generally horizontally disposed panel-like members adapted to define supports upon which bed mattresses may be placed and which include remote edge portions disposed inwardly of vertical planes containing the outer surfaces of the opposite side walls of said load bed and are extendable outwardly over the upper marginal edge portions of said side walls of said load bed when said panel-like members are shifted away from each other.

6. The combination of claim 5 wherein said mounting means, when retracted, overlie the upper portions of said opposite side housings.

7. The combination of claim 5 wherein said load bed includes a horizontally disposed tailgate projecting rearwardly from the rear end of said load bed, and a horizontally swingable door member supported from the rear end of one of said housing and swingable to a closed position extending between the rear ends of said housings.

8. In combination with a vehicle load bed of the type including upstanding opposite side walls interconnected at their forward ends by means of a front wall and by means of a tailgate at their rear ends swingable between an upright position and a horizontal rearwardly projecting load bed extension position, a pair of elongated spaced apart opposite side housings positioned on said load bed inwardly of the opposite side walls thereof, and forwardly of the tailgate when the latter is closed, a pair of mounting means supported for horizontal extension and retraction relative to said side walls closely above the latter, a pair of side wall frame means supported from said mounting means, a flexible cover stretched over and between said side wall frame means, said cover including a rear wall panel whose lower marginal edge portions are adapted for anchoring adjacent the rear ends of said housings, a horizontally swingable door member supported from the rear end of one of said housings and swingable to a closed position extending between the rear ends of said housing, said rear wall panel including an opening therein vertically aligned with the space between the rear ends of said housings.

9. The combination of claim 8 including a horizontal center ridge pole elevated above said side wall frame means over which the central portion of said cover passes.

10. The combination of claim 9 wherein said cover includes a rear panel extending between the rear ends of said side wall frame means, the rear end of said ridge pole being supported from adjacent the rear ends of said housings by means of an inverted U-shaped standard secured at its upper apex portion to the rear end of the ridge pole and having the lower ends of its divergent legs anchored adjacent the rear ends of the housings, said rear including portions extending along and adapted to be secured to the legs of the inverted V-shaped standard, one of said portions of said rear panel including a generally inverted V-shaped flap portion swingable into and out of position closing the area between the downwardly divergent leg portion of the standard, and the free edge portion of said flap and the other portion of said rear panel including coacting slide fastener means removably securing said free edge portion of said flap portion to said other portion of said rear panel.

References Cited

UNITED STATES PATENTS

| | | | |
|---|---|---|---|
| 3,377,098 | 4/1968 | Bontrager | 296—27 |
| 3,170,724 | 2/1965 | Heil | 296—23 |
| 1,715,971 | 6/1929 | Wilson | 296—23.6 |
| 1,241,342 | 9/1917 | Chapman | 296—23.6 |

FOREIGN PATENTS 589,724  6/1947  Great Britain.

PHILIP GOODMAN, Primary Examiner

U.S. Cl. X.R.

135—1